United States Patent [19]

Krueger

[11] 4,357,236
[45] Nov. 2, 1982

[54] AUTOMATIC ADDITION OF A CORROSION INHIBITOR TO A COOLANT SYSTEM BY OSMOTIC PRESSURE

[75] Inventor: Robert H. Krueger, Palatine, Ill.

[73] Assignee: Borg-Warner Corporation, Chicago, Ill.

[21] Appl. No.: 39,995

[22] Filed: May 17, 1979

[51] Int. Cl.³ .............................................. B01D 31/00
[52] U.S. Cl. .................................... 210/167; 210/171; 210/195.2; 210/206; 210/257.2; 210/433.2; 123/41.55; 422/264; 422/265; 222/54
[58] Field of Search ............. 222/54; 210/321 R, 167, 210/170, 171, 195.2, 206, 257.2, 220, 321 A, 221 M, 321 B, 433 M, 433.2; 422/264, 264 B, 265; 62/85; 123/41.55

[56] References Cited

U.S. PATENT DOCUMENTS

| | | | |
|---|---|---|---|
| 3,468,796 | 9/1969 | Noll et al. | 210/22 |
| 3,607,103 | 9/1971 | Kiefer | 422/265 |
| 3,749,646 | 7/1973 | Pirt | 210/22 |
| 3,772,193 | 11/1973 | Nelli et al. | 210/62 |
| 3,853,478 | 12/1974 | Rodgers | 210/321 R |
| 3,979,295 | 9/1976 | Markley | 210/321 B |
| 4,077,407 | 3/1978 | Theeunes et al. | 128/260 |

FOREIGN PATENT DOCUMENTS 612268 1/1961 Canada ................................. 422/265
WO79/00150 3/1979 PCT Int'l Appl.

Cohan, H. J., "Electrodialysis—equipment and Membranes", Chem. Eng. Prog., vol. 57, No. 2, Feb. 1961, pp. 72–76.

OTHER PUBLICATIONS

Levenspiel, O. et al., "The Osmotic Pump", Science 1/18/74, vol. 183, No. 4121, pp. 157–160.

Primary Examiner—David R. Sadowski
Attorney, Agent, or Firm—James A. Geppert

[57] ABSTRACT

A device for the automatic addition of a corrosion inhibitor to a cooling system, such as in an automobile engine, utilizing osmotic pressure. The device includes a container for a concentrated corrosion inhibitor solution with a semi-permeable osmotic membrane in contact with and separating the inhibitor solution from the coolant in the overflow reservoir. With properly inhibited coolant, the osmotic pressures balance, but if the level of inhibitor in the coolant drops, water passes through the membrane to force inhibitor solution through an overflow tube or opening to mix with the coolant and raise the inhibitor level therein to a predetermined value.

12 Claims, 2 Drawing Figures

AUTOMATIC ADDITION OF A CORROSION INHIBITOR TO A COOLANT SYSTEM BY OSMOTIC PRESSURE

BACKGROUND OF THE INVENTION

Engine coolants utilized by the automotive industry for the cooling system of a vehicle usually contain ethylene glycol with a small percentage of diethylene glycol diluted with water to provide a 50% or lower concentration of glycol depending on the desired freezing point for the cooling system. Most companies that manufacture and/or distribute the engine coolants add corrosion inhibitors to the solution to prevent corrosion of the copper-brass materials traditionally used in the manufacture of vehicle radiators. These inhibitors usually are a mixture of one or more inorganic salts, such as phosphates, borates, nitrates, nitrites, silicates or arsenates, and an organic compound, such as benzotriazole, tolyltriazole or mercaptobenzothiazole, to prevent copper corrosion. The solution is generally buffered to a pH of 8-10 to reduce iron corrosion and to neutralize any glycolic acid formed in the oxidation of ethylene glycol.

Most manufacturers recommend a maximum of one or two years' service for their antifreeze coolant, however, the average car owner does not make an effort to follow the owner's instruction manual to maintain protection to $-20°$ F. for the coolant system, nor does the owner periodically check the coolant to determine if it is rusty or dirty. Many owners only add water to the coolant system when the antifreeze is lost through leakage or hose breakage.

In normal passenger car service, 25% of the new cars require coolant system servicing after only one year and, after two years, this percentage rises to 50%. In a conventional cooper-brass radiator, it is extremely important that the antifreeze or coolant mixture contain 50 to 55% of correctly inhibited ethylene glycol. A reduction in glycol concentration to a mixture of 33% ethylene glycol—67% water with a corresponding reduction in the inhibitor level will increase metal corrosion significantly. This is of special importance with higher temperature coolant systems which are becoming more common due to the increased use of emission controls.

Also, the increased emphasis on gas mileage for new automobiles has resulted in downsizing and weight reduction of the new cars. Weight reduction is accomplished through the substitution of lightweight metals or plastics for iron and steel in the body and other components of the car. For example, aluminum radiators may be utilized in automobile coolant systems in place of the copper-brass radiators previously used. An aluminum radiator appears to be more susceptible than copper-brass radiators to the corrosive action of a coolant or antifreeze that is low in the percentage of ethylene glycol and/or corrosion inhibitor present in the coolant. In such a system, additional corrosion inhibitor must be added or the aluminum will begin to pit at a rapid rate. The present invention ameliorates the corrosion problem by providing for the systematic addition of a corrosion inhibitor under corrosive conditions for the coolant.

SUMMARY OF THE INVENTION

The present invention relates to a device for the automatic addition of corrosion inhibitor to a coolant system when the concentration of ethylene glycol and/or the concentration of corrosion inhibitor drops below a predetermined level. The device involves the use of an osmotic membrane as a surface exposed to the engine coolant within a container supporting the membrane and having the corrosion inhibitor therein. Osmosis is defined as the flow of a solvent into a solution, or from a more dilute solution to a more concentrated solution when the two liquids are separated from each other by a membrane. Membranes which allow free passage of the solvent, in the present instance—water, but not the dissolved substance are termed semi-permeable.

The rate of movement of solvent molecules through a semi-permeable membrane will depend on the osmotic pressure difference across the membrane. The device of the present invention comprehends a container for the corrosion inhibitor in a concentrated solution with the semi-permeable membrane separating the inhibitor solution from the coolant. A lower container portion may be used to aid in supporting the membrane but allowing entrance of the coolant therein. The upper end of the container has an overflow opening to allow corrosion inhibitor solution to be forced out by the osmotic pressure differential and added to the coolant system.

To be effective in adding inhibitor to corrosive water the following criteria must be satisfied:

(1) The concentrated liquid corrosion inhibitor in the container should have an osmotic pressure equal to the pressure of the inhibited 50% ethylene glycol—50% water solution.

(2) The membrane must be semi-permeable to prevent diffusion of corrosion inhibitor salts therethrough where a 50—50 ethylene glycol-water solution is in the coolant system.

(3) The membrane must be stable over the average life of the automobile.

(4) In the event the ethylene glycol solution is replaced with water, the osmotic pressure should force sufficient corrosion inhibitor into the water to protect the cooling system metals.

Further objects are to provide a construction of maximum simplicity, efficiency, economy and ease of assembly and operation, and such further objects, advantages and capabilities as will later more fully appear and are inherently possessed thereby.

DESCRIPTION OF THE PREFERRED EMBODIMENTS

Figure 1:
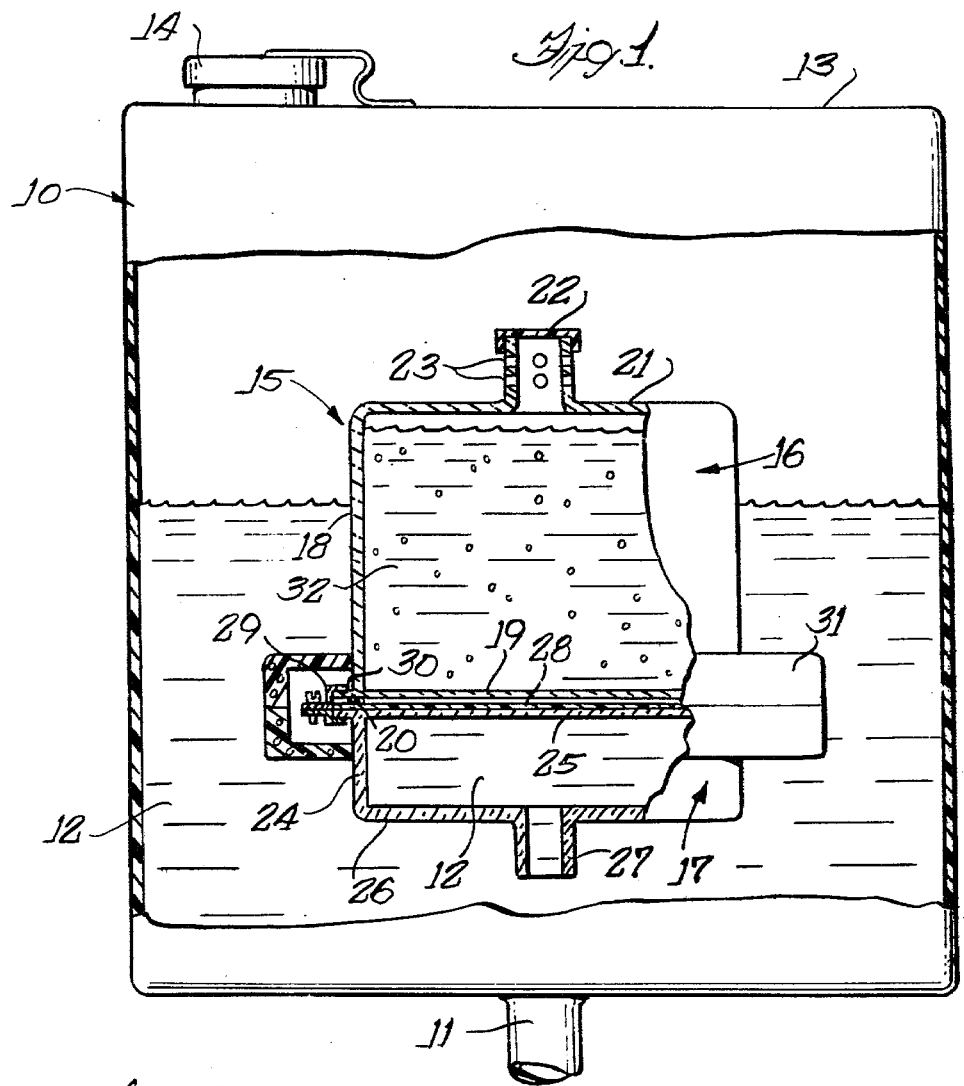
FIG. 1 is a side elevational view partially in cross section of a device for adding corrosion inhibitor to a coolant system using a semi-permeable osmotic membrane.

Referring more particularly to the disclosure in the drawing where are shown illustrative embodiments of the present invention, FIG. 1 discloses an overflow reservoir 10 in an automotive cooling system having a conduit 11 at the bottom of the reservoir for admitting or emitting the liquid coolant 12 and a cap 14 for an opening in the closed upper end 13 to allow the addition or replacement of the coolant.

Within the reservoir, a device 15 for the addition of corrosion inhibitor to the body of coolant 12 is floating therein. The device floats in view of the difference in the coolant level when the coolant is hot and cold. The device includes an upper container portion 16 and a lower container portion 17; each formed of a suitable material, such as a glass which is resistant to the temperature extremes for an automotive coolant system. The upper container 16 has a cylindrical side wall 18, a fritted glass base 19 and a closed upper end 21 having a capped overflow tube 22 therein with openings 23 in the tube to allow the exit of liquid from the container. The overflow tube 22 is located above the level of coolant due to the floating action of the device.

The lower container 17 includes a cylindrical side wall 24, an upper end 25 formed of fritted glass and a closed lower end 26 with a short depending tube 27 allowing the entrance of coolant thereinto. Between the fritted glass ends 19 and 25 is positioned a semi-permeable osmotic membrane 28, which is sealed by suitable means, such as an O-ring or gasket 20, to prevent leakage and may be secured by a clamp 29 holding peripheral lips or flanges 30 of the container portions 16 and 17 together. A two piece float collar 31 formed of a suitable material, such as polystyrene, is located to encompass the clamp 29 and the adjacent lips 30 of the upper and lower containers 16 and 17, respectively, to float the device in the coolant with the overflow tube above the coolant level. A concentrated corrosion inhibitor solution 32 is stored in the upper container 16.

Under normal conditions, the overflow reservoir 10 is partially full of the engine coolant and communicates via the depending tube 11 with the radiator of the engine cooling system (not shown). If a leak develops in the system, a hose ruptures, or the mixture partially boils away due to overheating, the vehicle operator is likely to replace the lost coolant with any readily available water. This water is obviously untreated and is likely to be corrosive to the metal of the radiator. When the water is circulated through the system and reaches the reservoir 10, the lower glycol and inhibitor concentration in the coolant contacting the membrane 28 results in water passing through the membrane into the upper container 16 due to the difference in osmotic pressures. Additional water in the container 16 causes corrosion inhibitor solution 32 to overflow through the openings 23 in the tube 22 and mix with the coolant. This condition continues until the osmotic pressure is stabilized with sufficient corrosion inhibitor added to the coolant to prevent corrosion of the radiator. The system will then remain stabilized unless the concentration of inhibitor again drops through aging or leakage.

Figure 2:
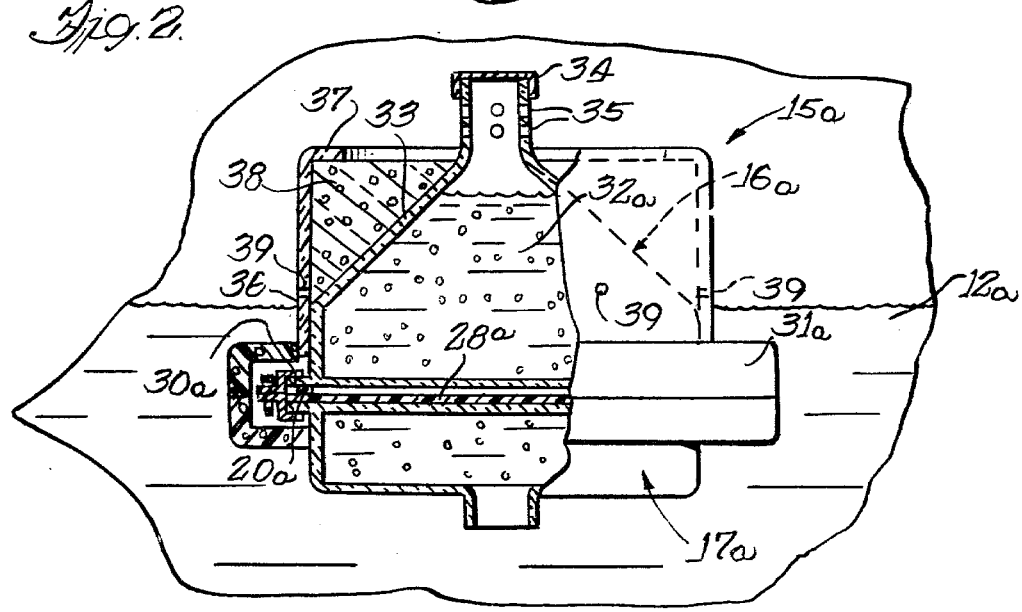
FIG. 2 is a side elevational view partially in cross section of an alternate form of device.

FIG. 2 discloses an alternate form of device wherein like parts will have the same numeral with the addition of a script a. The device 15a is floating in the coolant 12a of an overflow reservoir and has an upper container 16a and a lower container 17a with a semi-permeable osmotic membrane 28a clamped therebetween. A float collar 31a is mounted at the juncture of the containers. The upper container 16a has a generally conical upper wall portion 33 terminating at the upper end 34 with openings 35 therein located above the coolant level. Encompassing the container 16a is a generally cylindrical wall 36 terminating short of the lip 30a of the container 16a and having an upper inwardly extending flange 37 terminating short of the overflow tube 34. The container 16a is filled with a concentrated corrosion inhibitor solution 32a while additional solid corrosion inhibitor 38 is located between the wall 36 and container 16a. The wall includes a plurality of small circumferentially spaced drain holes 39 adjacent the intersection of wall 36 with conical wall portion 33.

This device operates in substantially the same manner as the device of FIG. 1, with the addition that the corrosion inhibitor solution 32a issuing from the overflow tube 34 flows downward into the solid inhibitor 38 to dissolve the material and further concentrate the solution. The concentrated solution passing through the solid inhibitor 38 exits through the drain openings 39 to mix with the coolant until a satisfactory level of inhibitor in the coolant is achieved.

I claim:

1. A device for the automatic addition of a corrosion inhibitor into a coolant system having an overflow reservoir to protect a heat exchanger subject to corrosion, comprising a container for a concentrated corrosion inhibitor solution having an overflow tube at the upper end and an opening into the lower end of the container to allow entry of the coolant therein, a semi-permeable osmotic membrane located in said container separating the corrosion inhibitor solution from the inhibited coolant, and means encompassing at least a portion of the container to cause it to float in the coolant with the overflow tube above the level of the coolant, the osmotic pressure of the corrosion inhibitor solution being equal to that of the inhibited coolant but less than the osmotic pressure of inhibitor depleted coolant to cause water to pass through the membrane into the corrosion inhibitor solution to force solution from the overflow tube into the body of coolant in the reservoir when there is a difference in osmotic pressures.

2. A device as set forth in claim 1, in which said container includes an upper portion and a lower portion with the periphery of said membrane clamped between the container portions.

3. A device as set forth in claim 2, including means to support the membrane in said container.

4. A device as set forth in claim 2, in which said lower container portion includes a depending tube to allow entrance of coolant into said lower container portion and contact the membrane.

5. A device for the automatic addition of a corrosion inhibitor into a coolant system having an overflow reservoir to protect a heat exchanger subject to corrosion, comprising a container for a concentrated corrosion inhibitor solution having an upper portion with an overflow tube in the upper end thereof and a lower portion having an opening in the lower end thereof to allow entry of the coolant therein, a semi-permeable osmotic membrane located in the container with its periphery clamped between the container portions to separate the corrosion inhibitor solution from the inhibited coolant, means to clamp the container portions together, and means encompassing said clamping means to cause the container to float in said coolant, the osmotic pressure of the corrosion inhibitor solution being equal to that of the inhibited coolant but less than the osmotic pressure of inhibitor depleted coolant to cause water to pass through the membrane into the corrosion inhibitor solution to force solution from the overflow tube into the body of coolant in the reservoir when there is a difference in osmotic pressures.

6. A device for the automatic addition of a corrosion inhibitor into a coolant system having an overflow reservoir to protect a heat exchanger subject to corrosion, comprising a container for a concentrated corrosion inhibitor solution having an upper portion with an overflow tube in the upper end thereof and a lower portion having an opening in the lower end thereof to allow entry of the coolant therein, a semi-permeable osmotic membrane located in the container with its periphery clamped between the container portions to separate the corrosion inhibitor solution from the inhibited coolant, said upper container portion having a generally conical wall terminating at the upper end in said overflow tube, and a generally cylindrical wall encompassing the conical wall and abutting the conical wall at its largest diameter, said cylindrical wall providing an upper open end to receive solid corrosion inhibitor therein, the osmotic pressure of the corrosion inhibitor solution being equal to that of the inhibited coolant but less than the osmotic pressure of inhibitor depleted coolant to cause water to pass through the membrane into the corrosion inhibitor solution to force solution from the overflow tube into the body of coolant in the reservoir when there is a difference in osmotic pressures.

7. A device as set forth in claim 6, in which said cylindrical wall has a plurality of small drain openings therein adjacent the lower edge thereof, such that corrosion inhibitor overflowing the upper container portion passes through the solid corrosion inhibitor to form a more concentrated solution and passes through the drain openings to the coolant.

8. A device as set forth in claim 7, including means to support the membrane, clamping means to retain the container portions together, and a float collar encompassing the container and clamping means to cause the container to float in the coolant.

9. A device for the automatic addition of a treating chemical into a solution to be treated, comprising a container for the treating chemical having an upper portion with an overflow tube in the upper end thereof and a lower portion having an opening in the lower end thereof to allow entry of the solution to be treated thereinto, a semi-permeable osmotic membrane located in the container with its periphery clamped between the container portions to separate the treating chemical from the solution to be treated, means encompassing said container to cause the container to float in the solution to be treated with the overflow tube above the level of the solution, the osmotic pressure of the treating chemical being equal to that of the treated solution but less than the osmotic pressure of untreated solution such that the solvent of the solution will pass through the membrane into the treating chemical to force concentrated chemical solution from the overflow tube into the solution to be treated when there is a difference in osmotic pressures.

10. A device as set forth in claim 9, including means to support the membrane between the container portions.

11. A device as set forth in claim 9, including means to clamp the container portions together, and said floatation means comprising a float collar encompassing said clamping means.

12. A device as set forth in claim 9, in which said upper container portion includes a generally conical wall terminating at its upper end in said overflow tube, and a generally cylindrical wall encompassing said conical wall and having an upper open end and drain openings adjacent the lower edge, said lower edge abutting the conical wall at its largest diameter, said cylindrical wall and conical wall defining a chamber therebetween to receive additional solid treating chemical.

* * * * *